United States Patent
Bit-Babik et al.

(10) Patent No.: US 10,873,349 B1
(45) Date of Patent: Dec. 22, 2020

(54) PORTABLE COMMUNICATION DEVICE WITH ANTENNA RADIATION PATTERN CONTROL

(71) Applicant: MOTOROLA SOLUTIONS, INC., Chicago, IL (US)

(72) Inventors: Giorgi G. Bit-Babik, Plantation, FL (US); Antonio Faraone, Fort Lauderdale, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/446,892

(22) Filed: Jun. 20, 2019

(51) Int. Cl.
| H04B 1/00 | (2006.01) |
| H01Q 1/48 | (2006.01) |
| H04B 1/44 | (2006.01) |
| H01Q 9/30 | (2006.01) |

(52) U.S. Cl.
CPC ............ *H04B 1/0064* (2013.01); *H01Q 1/48* (2013.01); *H01Q 9/30* (2013.01); *H04B 1/44* (2013.01)

(58) Field of Classification Search
CPC combination set(s) only.
See application file for complete search history.

(56) References Cited

U.S. PATENT DOCUMENTS

| 5,990,838 A * | 11/1999 | Burns ................. H01Q 1/38 343/702 |
| 6,225,951 B1 | 5/2001 | Holshouser et al. |
| 9,923,272 B2 * | 3/2018 | Sorensen ............. H01Q 7/005 |
| 2006/0118625 A1* | 6/2006 | Sekita ................. G06F 1/162 235/451 |
| 2012/0112979 A1* | 5/2012 | Kato ................... H01P 1/20 343/853 |
| 2013/0002503 A1* | 1/2013 | Tan ..................... H01Q 1/243 343/803 |
| 2019/0181556 A1* | 6/2019 | Faraone .............. H01Q 5/321 |

OTHER PUBLICATIONS https://www.researchgate.net/figure/The-3D-viewshed-from-an-observer-is-calculated-by-analyzing-the-360-equiangular_fig12_304673723, downloaded on Jun. 7, 2019.

* cited by examiner

*Primary Examiner* — Junpeng Chen
(74) *Attorney, Agent, or Firm* — Perry + Currier, Inc.

(57) ABSTRACT

A portable wireless communication device comprises a housing, a ground reference mass, a first antenna element, and a second antenna element. The first antenna element and the second antenna element are located at different sides of the housing. A radio-frequency (RF) port is electrically coupled to the first antenna element. An RF transmission line is located between the RF port and the second antenna element. The ground reference mass comprises a ground structure of the RF transmission line. An RF transceiver is electrically coupled to the first antenna element. The RF transceiver is further electrically coupled to the RF port to further electrically couple the RF transceiver to the second antenna element via the RF transmission line.

20 Claims, 10 Drawing Sheets

PORTABLE COMMUNICATION DEVICE WITH ANTENNA RADIATION PATTERN CONTROL

BACKGROUND OF THE INVENTION

Some portable wireless communication device antennas feature radiation patterns that point towards the terrain in some operating frequency bands, for example when the portable wireless communication device is in certain operating positions. Such a situation may degrade or impede communications with wireless communication networks or other devices.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
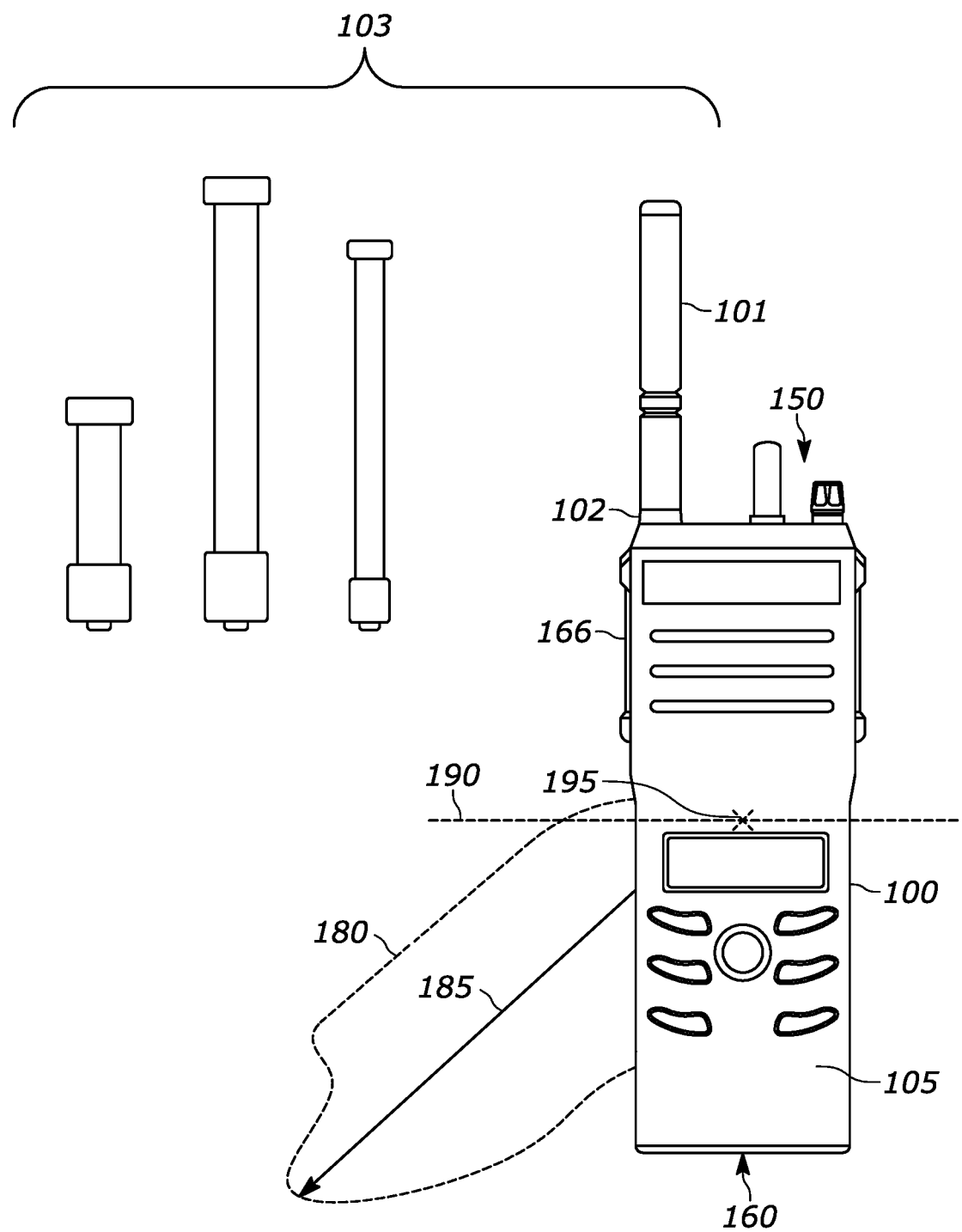
FIG. 1 depicts a communication device with antenna radiation pattern control as well as detachable antennas therefor, in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Some portable wireless communication device antennas feature radiation patterns that point towards the terrain in some operating frequency bands, for example when the portable wireless communication device is in certain operating positions. Such a situation can degrade or impede communications with communication networks or other devices. For example, quarter-wavelength (QW) monopole antennas installed at a top end (and/or adjacent a top end) of portable wireless communication devices are often used within land-mobile radio (LMR) two-way radios (e.g. a portable wireless communication device) due to their small physical size in the 700-900 MHz frequency range. Such LMR radios are often used by public service personnel, such as police officers and the like. Similarly installed half-wavelength (HW) monopole antennas may have better communication performance than QW antennas, due to higher gain towards useful propagation directions about the horizon when an LMR radio is vertically oriented (e.g. in a holster on a belt of a police officer and the like), as further described below. However, such HW antennas may be twice as physically long as QW antennas and hence may exhibit a less convenient physical interaction with radio users than QW antennas. However, QW antennas may not be optimal for LMR radio communication performance as their radiation pattern may point towards the terrain, rather than towards the horizon, when an LMR radio is vertically oriented, which generally occurs when the LMR radio is in most body-worn operating positions. Hence, such body-worn operating positions may have relatively high "body loss factors" resulting in a relatively low median (and/or average) value of an azimuth antenna gain pattern, the value being extracted from a distribution of antenna gain figures relative to equiangular directions, departing from a portable wireless communication device assembly geometrical midpoint, that lay on an azimuth plane that is parallel to a flat horizontal terrain. Consequently, the radio-frequency (RF) coverage design of an LMR infrastructure (e.g. density of infrastructure antenna towers, and the like) may be influenced by requirements to accommodate these degraded communications characteristics while ensuring a predefined level of RF coverage, particularly for public-safety mission-critical LMR networks; for example, a relatively dense deployment of antenna towers may be required to provide sufficiently reliable RF coverage, which may increase infrastructure deployment and maintenance costs.

Briefly, there is provided herein an antenna comprising an antenna element, a mechanical connector configured to removably attach the antenna element to a complementary receptacle of a portable wireless communication device, a first electrode configured to couple the antenna element to an RF transceiver of the portable wireless communication device when the antenna element is removably attached to the complementary receptacle of the portable wireless communication device via the mechanical connector. The antenna further comprises a second electrode configured to couple to an RF port of the portable wireless communication device, the first electrode and the second electrode are electrically coupled to each other such that, when the antenna element is removably attached to the complementary receptacle of the portable wireless communication device via the mechanical connector, the RF transceiver is further electrically coupled to the RF port via the first electrode and the second electrode.

Briefly, there is further provided herein a portable wireless communication device comprising a housing, a ground reference mass, a first antenna element, and a second antenna element. The first antenna element and the second antenna element are located at different sides of the housing. A radio-frequency (RF) port is electrically coupled to the first antenna element. An RF transmission line is located between the RF port and the second antenna element. The ground reference mass comprises a ground structure of the RF transmission line. An RF transceiver is electrically coupled to the first antenna element. The RF transceiver is further electrically coupled to the RF port to further electrically couple the RF transceiver to the second antenna element via the RF transmission line.

Attention is directed to FIG. 1, which depicts a perspective view of an example portable wireless communication device 100 with radiation pattern control, with the portable wireless communication device 100 depicted in a vertical direction and/or orientation, as described in more detail below. The portable wireless communication device 100 is interchangeably referred to hereafter as the device 100. The device 100, as depicted, includes a detachable antenna 101 attached thereto, for example at a complementary receptacle 102 (e.g. an antenna receptacle) of the device 100, the detachable antenna 101 being one of a plurality of detachable antennas 103 that can be operated as part of the device 100 (e.g. any of the antennas 103 may be interchanged with the detachable antenna 101 at the device 100). In particular, the complementary receptacle 102 is located at a top end 150 of the device 100.

A number of the detachable antennas 103 may comprise the one detachable antenna 101, or multiple detachable antennas, for example in addition to the detachable antenna 101 and/or in a kit with the device 100 and/or the detachable antenna 101. Each of the plurality of detachable antennas 103 may generally operate at a different set of respective frequency bands; in particular, as will be described in more detail below, each of the plurality of detachable antennas 103 generally comprises a respective antenna element, such as a QW antenna element, which operates at a respective set of frequency bands. Such a respective antenna element may comprise a single component that individually enables, or it may comprise multiple components that together enable, communications in the respective set of frequency bands. Each of the plurality of detachable antennas 103 further comprises a respective housing and/or casing protecting a respective antenna element. Hence, in the present specification, an antenna comprises a housing, an antenna element, mechanical components for attaching to the complementary receptacle 102, and/or any other suitable components (e.g. an antenna impedance matching circuit realized within a printed circuit board embedded within an antenna housing). In particular, some or each of the plurality of detachable antennas 103 may include components that interface with the device 100 to provide radiation pattern control, as described in more detail below. In general, when a user of the device 100 wishes to change an operating set of frequency bands, the user may swap the detachable antenna 101 for one of the other antennas of the plurality of detachable antennas 103.

While four detachable antennas 103 are depicted, the device 100 may be provided with any suitable number of detachable antennas, for example to address different user preferences in terms of antenna length and stiffness, and the like, and/or to enable operation of the device 100 in any suitable set of frequency bands and/or number of sets of frequency bands. Furthermore, in some examples, the antenna 101 may not be detachable and/or the device 100 may not be provided with additional detachable antennas.

In some examples, the plurality of detachable antennas 103 may comprise single-band QW antennas, however in other examples the plurality of detachable antennas 103 may include other types of antennas including, but not limited to, multi-band antennas and single-band HW antennas.

As depicted, the device 100 comprises a land-mobile radio (LMR), for example used by first responders; however, the device 100 may comprise any suitable communication device configured to receive detachable antennas, including, but not limited to, push-to-talk (PTT) radios, citizens broadband radio service (CBRS) radios and the like. Indeed, as depicted, the device 100 comprises a housing 105 that has an LMR form factor. However, while the device 100 as depicted is a portable wireless communication device, in other examples the device 100 may not be mobile and/or may be adapted for use in a vehicle, with the housing 105 adapted accordingly.

As depicted, the device 100 further comprises a push-to-talk (PTT) button 166, described in more detail below; however the PTT button 166 may be optional.

FIG. 1 further depicts an elevation radiation pattern 180 of the device 100, and a peak gain direction 185, described in more detail below. FIG. 1 further depicts the cross-section of a horizontal azimuth plane 190 and an assembly geometrical midpoint 195 of the device 100. The azimuth antenna gain pattern referred to above may thus be defined with respect to the device 100 as the distribution of antenna gain figures relative to equiangular directions, departing from the assembly geometrical midpoint 195 (e.g. a midpoint of the assembly of the device 100) of the device 100, that lay on the azimuth plane 190, which is parallel to a flat horizontal terrain relative to which the device 100 is vertically oriented.

Figure 2:
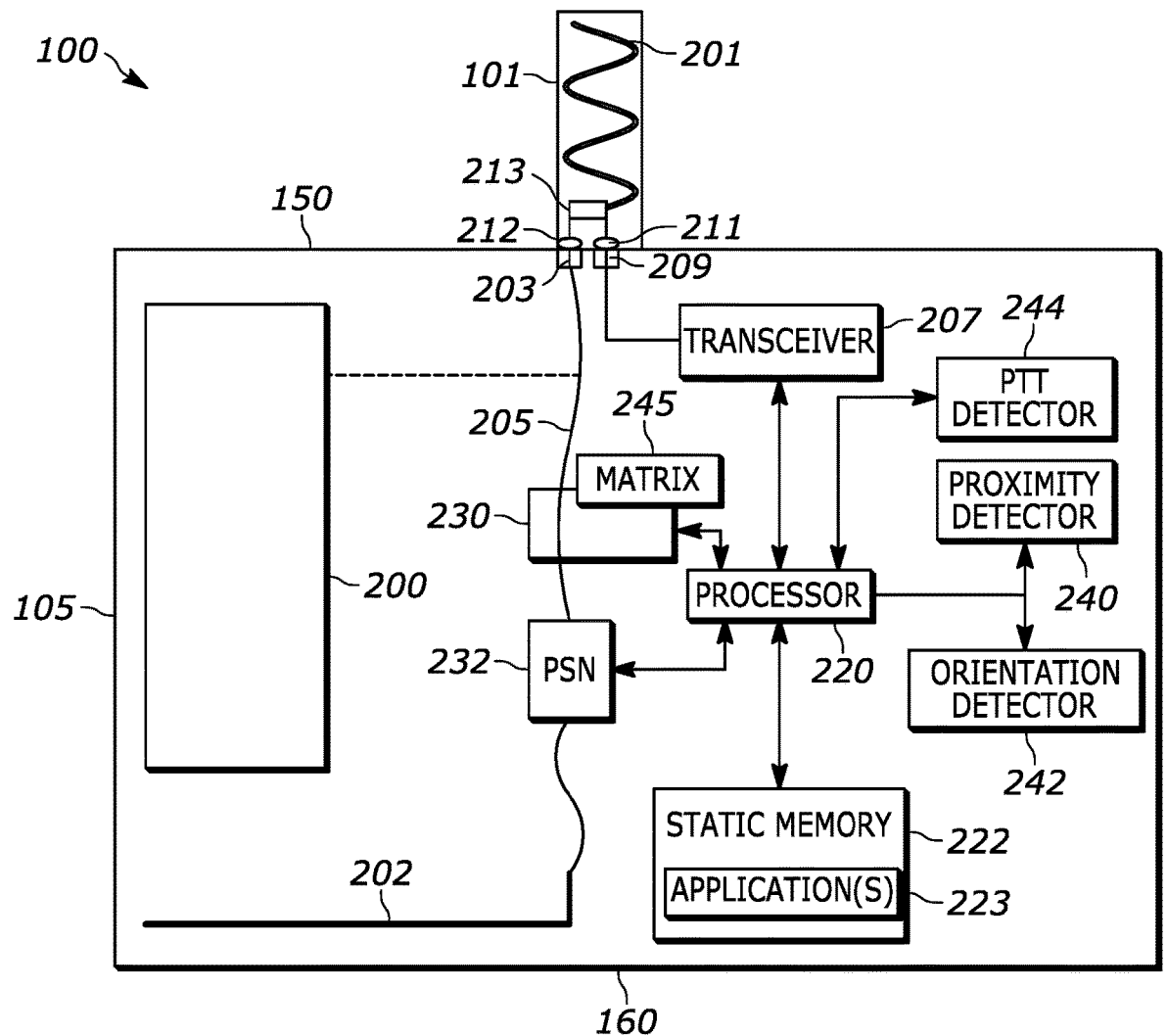
FIG. 2 is a device diagram showing a device structure of a communication device with antenna radiation pattern control, in accordance with some examples.

Attention is next directed to FIG. 2, which depicts a schematic block diagram of an example of the device 100 and the antenna 101. As depicted, the antenna 101 is attached to the device 100, however the antenna 101 may be detachable from the device 100. Indeed, in some examples the antenna 101 may be integrated with the device 100 (e.g. the antenna 101 may not be removable) however, in the depicted examples the antenna 101 is removable and/or the antenna 101 may be exchangeable with others of the plurality of detachable antennas 103.

As depicted, the device 100 comprises: the housing 105; a ground reference mass 200; a first antenna element 201, for example integrated within the antenna 101 (e.g. the first antenna element 201 is a component of the antenna 101); a second antenna element 202, which may be located at the bottom end 160 of the housing 105; an RF port 203 (which may be located substantially adjacent the first antenna element 201), the RF port 203 electrically coupled to the first antenna element 201; an RF transmission line 205 between the RF port 203 and the second antenna element 202, the ground reference mass 200 comprising a ground structure of the RF transmission line 205, as further described below; and an RF transceiver 207 electrically coupled to the first antenna element 201, the RF transceiver 207 further electrically coupled to the RF port 203 (as depicted, through the antenna 101 and/or via the antenna 101, as further described below) to further electrically couple the RF transceiver 207 to the second antenna element 202 via the RF transmission line 205. In contrast to the first antenna element 201, the second antenna element 202 may not be detachable as the second antenna element 202 may be internal to the device 100 and hence may be physically protected by the housing 105 of the device 100. However, in other examples, the second antenna element 202 may be detachable from the device 100 and/or be one of a plurality of second antenna elements.

The ground reference mass 200 may generally comprise an internal electrically conducting and/or metal chassis of the device 100, for example, as well as portions of other electrically conducting and/or metal elements (e.g. printed circuit boards, metal stiffeners and chassis, RF transmission lines, RF interconnections, and the like, which may be electrically coupled to each other). The ground reference mass 200 acts as an RF ground reference for the electrical components of the device 100 and may act as a respective electrical counterpoise of the antenna elements 201, 202, enabling the establishment of radiating RF currents in order to attain respective radiated antenna performances (e.g. efficiency, radiation pattern, polarization, and the like). As depicted, a connection between the RF transmission line 205 and the ground reference mass 200 is depicted in dashed lines to indicate that the ground structure of the RF transmission line 205 (e.g. a coaxial cable braided shield) is part of the ground reference mass 200. Although the dashed-line connection is schematically depicted at just one location along RF transmission line 205 in FIG. 2, the connection generally represents the substantial reliance of the RF transmission line 205 (as well as any sub-component of the RF transmission line 205 along the route of the RF transmission line 205 between RF port 203 and the antenna element 202) on the RF ground reference provided by ground reference mass 200.

The RF transmission line 205 may comprise several cascaded sections and/or sub-components, each section comprising, for example, a distinct physical realization component, including, but not limited to, coaxial cable, printed-circuit-board (PCB) trace, board-to-board interconnect, and the like, which may be used to satisfy given product integration requirements. Each section of the RF transmission line 205 may comprise a respective ground structure (such as shielding, a PCB ground layer, a coaxial shield component, and the like), that is part of the ground reference mass 200 via any suitable electrical interfaces therebetween.

As described above, the antenna 101 may be one of a plurality of detachable antennas 103, each of which comprises a respective antenna element. As such, the first antenna element 201 may be one of a plurality of first antenna elements each configured for removable attachment to the housing 105. For example, as depicted, the first antenna element 201 is a component of the antenna 101 which is removably attached to the housing 105 via the complementary receptacle 102; as such, the first antenna element 201 is removably attached to the housing 105 by virtue of the antenna 101 being removably attached to the housing 105. Similarly, each of the plurality of detachable antennas 103 may include a respective antenna element similar to the first antenna element 201; as such, each respective antenna element of the plurality of detachable antennas 103 are removably attachable to the housing by virtue of the antennas 103 being removably attachable to the housing 105.

While the first antenna element 201 is depicted as a helical antenna element, the first antenna element 201 may comprise a straight-wire monopole and/or any suitable type of antenna element of the antenna 101 that provide the functionality as described herein. However, as depicted, the first antenna element 201 may be helically wrapped around an insulating material within the antenna 101, and covered by an insulating protective cover (e.g. a housing of the antenna 101).

As depicted, the second antenna element 202 may comprise a monopole and/or any suitable type of antenna element. For example, the second antenna element 202 may be advantageously provided as a planar inverted-F antenna (PIFA), which is a device-integrated antenna design for single and multi-band operation that can be physically realized using several manufacturing technologies (e.g. stamped metal, flexible PCB circuit, laser-directed structuring (LDS), etc.).

In particular, the first antenna element 201 and/or the second antenna element 202 may comprise a QW antenna element having an electrical length, and the like, that is about a quarter of an operating wavelength of the first antenna element 201, including, but not limited to, wavelengths corresponding to frequencies in a range of about 700 MHz to about 900 MHz. However, the first antenna element 201 and the second antenna element 202 may have different physical lengths.

As depicted the first antenna element 201 and/or the antenna 101 generally extends outward from the device 100, for example from the top end 150 of the housing 105 and/or the device 100 (e.g. see FIG. 1), while the second antenna element 202 may be oriented in a direction substantially perpendicular to the first antenna element 201. The antennas may be located on different sides of the housing 105. As depicted, the second antenna element 202 is integrated within the device 100 (e.g. internal to the device 100) and located at an end of the device 100 opposite an end at which the first antenna element 201 is located. For example, the second antenna element 202 may be located at about the bottom end 160 of the housing 105 (and/or the device 100), opposite the top end 150.

However, the antenna elements 201, 202 may be at any suitable orientation to one another, with the electrical length, and the like, of the RF transmission line 205 selected and/or controlled accordingly to orient and/or control a total radiation pattern accordingly as described hereafter.

In general, the first antenna element 201 may be configured to operate over a first set of operating frequency bands, and the second antenna element 202 may be configured to operate over a second set of operating frequency bands that at least partially overlaps with the first set of operating frequency bands. The operating frequencies of the second antenna element 202 may hence be the same or different as the operating frequencies of the first antenna element 201. Regardless, the operating frequencies of the antenna elements 201, 202 generally overlap, and in such an event a radiation pattern of the first antenna element 201 is changed by the second antenna element 202, for example when each are operated by the transceiver 207 via the RF transmission line 205.

In particular, as will be explained in further detail below, when the first antenna element 201 is operated by the transceiver 207 without the second antenna element 202 being fed through RF port 203, and the device 100 is vertical relative to a flat terrain, the peak gain direction of the radiation pattern of the first antenna element 201 may be substantially pointing in a downwards direction, and/or towards an end and/or the bottom end 160 of the housing 105 and/or the device 100 that is opposite the end and/or the top end 150 at which the first antenna element 201 is located, the bottom end 160 being closer than the top end 150 to the flat terrain when the device 100 is vertical relative to the flat terrain. Such a situation may be particularly problematic when the antenna element 201 comprises a QW antenna element, because QW antenna elements are usually shorter and thinner and/or narrower than the ground reference mass 200 within the housing 105 as will be explained in further detail below. An example of such a radiation pattern is described below with respect to FIG. 3A, in relation to a vertically oriented device 100 above a flat terrain (not depicted), where a peak gain direction 330A of a radiation pattern 301A is shown to be oriented at a substantially large angle (e.g. in a downward direction) relative to an azimuth plane whose cross-section is indicated by a dashed line 390.

Figure 3B:
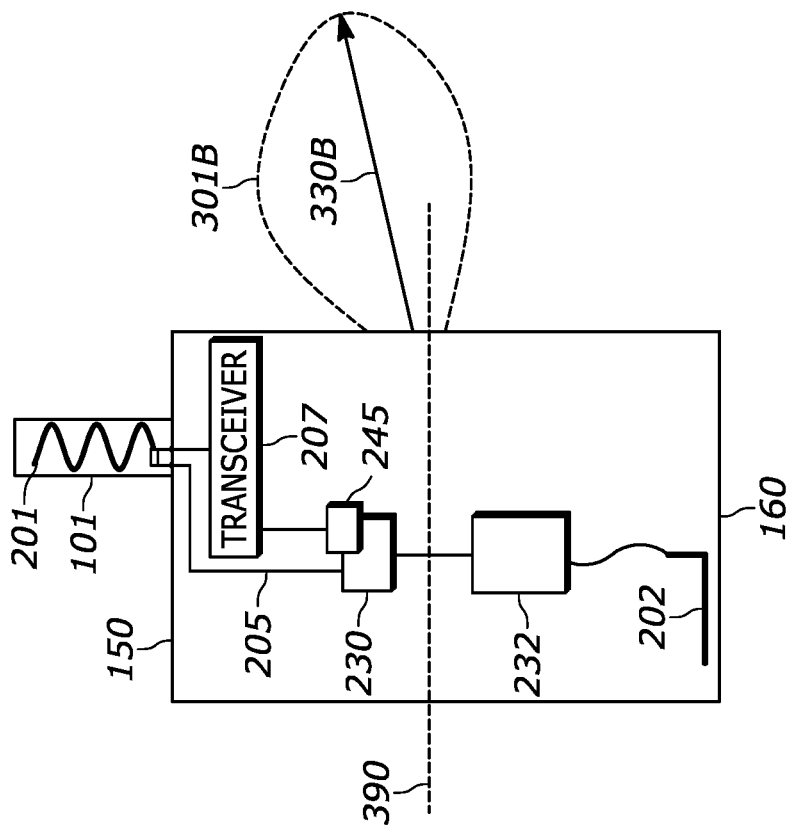
FIG. 3A, FIG. 3B, and FIG. 3C each depict a radiation pattern of the device of FIG. 2 under different operating conditions, in accordance with some examples.

However, again referring to FIG. 2, as well as FIG. 3B, when the first antenna element 201 is operated by the transceiver 207 in conjunction with the second antenna element 202, via the RF port 203 and the RF transmission line 205, the radiation pattern is changed so that a corresponding peak gain direction 330B of a radiation pattern 301B is oriented at a relatively small angle relative to the azimuth plane. Examples of such radiation patterns are described below with respect to FIG. 3B and FIG. 3C.

The aforementioned radiation pattern behaviors may be explained by considering the dimensional and geometrical features of the device 100 taken in conjunction with the antenna 101, and in relation with an operating free-space wavelength of the transceiver 207. For example, a vertical extension (e.g. vertical length) of the housing 105 may be in a range of about 12 cm to about 16 cm (e.g. for an LMR portable device), while a vertical extension (e.g. vertical length) of the antenna 101 and/or the antenna element 201, may be between about 8 cm to about 11 cm (e.g. when the antenna 101 is a QW antenna) for operating frequencies of the transceiver 207 in the 700-900 MHz range; hence the total vertical extension (e.g. total vertical length) of the device 100 including the antenna 101 (and/or the antenna element 201) may exceed one half of an operating wavelength within the operating transceiver frequency range; for example, at about 800 MHz, the wavelength is about 37.5 cm. Such a vertical extension of the housing 105 substantially corresponds to the vertical extension of ground reference mass 200 as well, since the assembly of housing parts forming the ground reference mass 200 generally occupies and/or extends into the large majority of the volume of the housing 105. Furthermore, a vertical extension of the antenna 101 substantially corresponds to the vertical extension of the antenna element 201 since it may be desirable to keep the physical size of antenna 101 as small as possible, thus not exceeding significantly the dimensions of the antenna element 201.

Furthermore, a QW antenna element 201 may generally require a complementary ground reference object (e.g. a large size ground plane) to provide an electrical counterpoise to enable efficient operation of the QW antenna element 201 (e.g. by facilitating an RF impedance match to a transceiver source); in some examples, the counterpoise for the QW antenna element 201 may be provided by substantial portions of the ground reference mass 200 within the device 100. Thus, the combination of the antenna element 201 and the ground reference mass 200 may be the key components of the radiating structure assembly of the device 100, while non-metallic materials within the device 100 and the antenna 101 play a secondary, yet important role, since dielectric losses may be limited by design in order to attain desirable communication performances, and the impact of the dielectric loading on the key components of the radiating structure assembly of device 100 may be controlled in order to enable efficient operation (e.g. by facilitating RF impedance match to a transceiver source) in desired frequency bands.

It is further appreciated that the assembly (and/or combination) of the housing 105 and the antenna 101 (e.g. when the antenna 101 is removably attached to the housing 105 at the complementary receptacle 102) is substantially asymmetrical, geometrically, in relation to the assembly geometrical midpoint 195. Therefore, given the aforementioned electrical extension of the aforementioned radiating structure assembly of device 100 (i.e., their combined physical extension exceeding half of an operating wavelength), and considering the aforementioned asymmetry of the radiating structure about the assembly geometrical midpoint 195, an elevation radiation pattern 180 corresponding to an RF signal transmitted and/or received by transceiver 207 may not necessarily be balanced about the azimuth plane 190 and, consequently, a peak gain direction 185 of the elevation radiation pattern 180 may not necessarily be oriented at a desirable small angle relative to its projection onto the azimuth plane 190.

In fact it is frequently observed, for example by means of measurements in an anechoic chamber, that two-way portable radios equipped with a single QW antenna installed about a top end, featuring the aforementioned typical sizes and operating within the 700-900 MHz frequency range, feature radiation patterns substantially oriented towards the flat terrain (e.g. in a downward direction) when the two-way portable radios are vertically oriented, with corresponding peak gain directions having relatively large angles from their projections onto an azimuth plane, thereby producing lower than desirable antenna gain levels about useful propagation directions falling within a small angle from their projections onto the azimuth plane. Clearly, flipping the two-way portable radios upside down would make their radiation patterns substantially oriented towards the sky rather than the flat terrain, with corresponding peak gain directions featuring an opposite yet still large angle from their projections onto the azimuth plane. However, operating a portable radio and/or a two-way portable radio (and/or the device 100) with a sizable antenna protruding from the bottom of its housing is not typically desirable.

The aforementioned asymmetry may in some examples produce a radiation pattern substantially oriented towards the sky when the radio is vertically oriented, while the pattern would be substantially oriented towards the flat terrain when the radio is flipped upside down.

Based on the foregoing, it is understood that the device 100 including the antenna elements 201, 202, with one located at about the top end 150 and the other located at about the bottom end 160, would exhibit an intermediate radiation pattern behavior (e.g. intermediate between the individual radiation pattern behaviors of the antenna elements 201, 202 that would be observable in the absence of one of the antenna element 201, 202) when both the antenna elements 201, 202 are concurrently fed respective scaled versions of an RF signal transmitted by the transceiver 207. Upon controlling the relative magnitude and phase differences between the respective RF signal versions fed to the antenna elements 201, 202, such an intermediate radiation pattern behavior generally results in the constructive coherent superposition of their respective radiation patterns along propagation directions oriented at small angles about their respective projections onto the azimuth plane, correspondingly attenuating propagation paths towards the flat terrain and the sky, thereby resulting in a composite (and desirable) radiation pattern.

While locating the first and second antenna elements at about opposite ends of device 100 provides significant flexibility in the synthesis of a desirable radiation pattern, in some examples the second antenna element may be placed at different sides of the device 100 that are not necessarily opposite to the end where the first antenna element is located. For example, the second antenna element may be located at about a lateral edge of the device 100, between the top end 150 and the bottom end 160, while preserving significant flexibility in the synthesis of a desirable radiation pattern.

Turning the attention back to FIG. 2 and considering that a predefined fraction of the RF signal transmitted by the RF transceiver 207 is routed to the antenna element 202 at the RF port 203, the orientation of the composite radiation pattern produced by the concurrent emission from the antenna elements 201, 202 may depend on the phase delay introduced by the RF transmission line 205 and/or a gain parameter of the RF transmission line 205 at operating wavelengths. Hence, in some examples, the length (and the like) of the RF transmission line 205 is selected such that the composite radiation pattern peak gain direction is about parallel to the azimuth plane 190 when the device 100 is in oriented in a vertical direction (e.g. see FIG. 4, where computer modelling software was used to model the shape of a radiation pattern of the device 100 when placed vertically about the belt of a portable radio user, in order to estimate a composite radiation pattern for different orientations and/or lengths of the second antenna element 202, and/or for different electrical lengths, and the like, of the RF transmission line 205.)

As will be described below, when the first antenna element 201 is removably attached to the housing 105, the first antenna element 201 may be removably attached to the housing 105 via the complementary receptacle 102 of the housing 105, which may also include the RF port 203.

As depicted, the first antenna element 201 is coupled to the RF transceiver 207 via a further RF port 209 located at about the complementary receptacle 102 of the housing 105, the further RF port 209 electrically coupling the RF transceiver 207 to a first electrode 211 of the first antenna element 201. Indeed, the RF port 203 may also be located at about the complementary receptacle 102, and may comprise a circular electrode at least partially around the further RF port 209 at about the complementary receptacle 102, as described in more detail with respect to FIG. 7.

As depicted, the first antenna element 201 may comprise a second electrode 212 electrically coupled to the first electrode 211, for example via an RF circuit 213, the second electrode 212 positioned to electrically couple to the RF port 203 about the complementary receptacle 102. Such examples, including the complementary receptacle 102, are also described in further detail below with respect to FIG. 7.

As depicted, the first antenna element 201 comprises: the first electrode 211 configured to electrically couple to the RF transceiver 207 via the further RF port 209; and the second electrode 212 configured to electrically couple to the RF port 203, the first electrode 211 and the second electrode 212 electrically coupled to each other via the RF circuit 213 at the first antenna element 201 (and/or the antenna 101) to couple the RF transceiver 207 to the RF port 203, thus couple the RF transceiver 207 to the second antenna element 202 via RF transmission line 205.

In particular, as depicted, the antenna 101 and/or the first antenna element 201 includes the RF circuit 213 which electrically couples the antenna 101 and the RF ports 203, 209, via the respective electrodes 212, 211. Hence, when the antenna 101 is removably attached to the device 100, the electrical coupling between the transceiver 207 and the RF port 203 (as well as the RF transmission line 205, and the second antenna element 202) occurs via first antenna element 201 and/or the antenna 101. Hence, in these examples, the device 100 may have backwards compatibility with antennas that do not have the RF circuit 213, as such antennas will generally electrically couple with the transceiver 207 via the further RF port 209, but not the RF port 203 and the second antenna element 202 (e.g. as such antennas elements will also lack the second electrode 212).

However, in other examples, the RF circuit 213, and/or a similar circuit, may be located internal to the device 100, for example between the RF transceiver 207 and the RF transmission line 205, and the first antenna element 201 and/or the antenna 101 will lack the second electrode 212. Alternatively, the RF circuit 213, and/or a similar circuit, may be formed at an interface between electrodes (not shown in FIG. 2) residing respectively within the antenna 101 and the device 100 as in the example, described below with respect to FIG. 6A and FIG. 6B, of an RF circuit 213 that includes a series capacitor 623 formed between the electrodes 613-2, 612 and an RF insulator 613-3 therebetween. Indeed, in some examples, the RF circuit 213 may be distributed between the device 100 and the antenna 101.

While the RF circuit 213 may comprise simple electrical connections between the electrodes 211, 212, in other examples the RF circuit 213 may include one or more of a resistor, a capacitor, an inductor, a transformer, a voltage-controlled reactance, an RF switch, combinations thereof, and the like. Furthermore, RF circuit 213 may include ground-return paths for RF current to flow to the ground reference mass 200 (e.g. via the complementary receptacle 102), these optional ground-return paths allowing the RF circuit 213 to realize a desirable circuital behavior (e.g., a frequency-dependent functionality, and/or an impedance matching functionality, and the like). In some examples, the RF transceiver 207 may be electrically coupled to the RF port 203 via one or more of: galvanic coupling; capacitive coupling; inductive coupling; and resonant coupling, for example via the RF circuit 213 and/or the first antenna element 201 and/or the antenna 101. The RF port 203 may similarly be electrically coupled to the first antenna element 201 via one or more of: galvanic coupling; capacitive coupling; inductive coupling; and resonant coupling. The first electrode 211 and the second electrode 212 may similarly be electrically coupled to each other at about the first antenna element 201 via one or more of: galvanic coupling; capacitive coupling; inductive coupling; and resonant coupling.

As depicted, the device 100 further comprises an electronic and/or a hardware processor 220, a static memory 222 storing at least one application 223 (e.g. computer executable instructions, executable by the processor 220). Furthermore, as depicted, the device 100 comprises an optional RF switch 230 located along the RF transmission line 205 and an optional phase delay and/or gain circuit (referred to in FIG. 2, and hereafter as the phasor-shaping network (PSN) 232) located along the RF transmission line 205, the PSN 232 being unidirectional or bidirectional, reciprocal or non reciprocal, and generally configured to provide amplification, attenuation, or both, of RF signals. The device 100 may comprise one or both of the RF switch 230 and the PSN 232, or the device 100 may not include either of the RF switch 230 and the PSN 232.

The PSN 232 is referred to (as depicted) as a phasor-shaping network as besides the aforementioned phase delay and/or gain functionality, the PSN 232 may include also frequency-selective functionality to change phasors of time-harmonic RF signals being routed through the PSN 232. Furthermore, the phasor-shaping functionality of the PSN 232 is understood to be dynamically adaptable from time to time, for example to provide different gain, phase delay, or frequency-dependent phasor alteration in response to controlling signals from processor 220.

The RF switch 230 may be operated by the processor 220 to electrically couple and uncouple the transceiver 207 from the second antenna element 202, for example to turn "on" and turn "off" their mutual coupling, such that the radiation patterns of the antenna elements 201, 202 are combined or not combined. The RF switch 230 may comprise any suitable electrical and/or electromechanical switch including, but not limited to, one or more field effect transistors (FETs), micro electromechanical switch (MEMS), and the like.

Furthermore, when the RF circuit 213 is located at the device 100 and not in the antenna 101, the processor 220 may be configured to: open the RF switch 230 when an antenna without the second electrode 212 is attached to the device 100; and close the RF switch 230 when an antenna with the second electrode 212 is attached to the device 100. Hence, in these examples, the device 100 may include a circuit for detecting when attached antennas include the second electrode 212 or do not include the second electrode 212 (e.g. including, but not limited to, an impedance detection circuit).

The PSN 232 may be operated by the processor 220 to change a phase delay and/or a gain parameter and/or an electrical length of the RF transmission line 205, for example to steer and/or control and/or change a composite radiation pattern of the antenna elements 201, 202. Hereafter the terms steer a composite radiation pattern, control a composite radiation pattern and change a composite radiation pattern will be used interchangeably. The PSN 232 comprises any suitable combination of electrical components (e.g. resistors and/or capacitors and/or inductors and/or transformers, transistors, amplifiers, RF switches, voltage-controlled reactances, and the like) for changing a phase delay and/or a gain parameter and/or an electrical length and/or a frequency-dependent functionality of the RF transmission line 205.

When the device 100 does not include either of the RF switch 230 and the PSN 232, the electrical properties (e.g. phase delay and/or a gain parameter and/or an electrical length and/or a frequency-selective functionality, etc.), and the like, of the RF transmission line 205 may be fixed and defined so that the composite radiation pattern of the antenna elements 201, 202 exhibits favorable balance with a peak gain direction 185 (e.g. referring briefly back to FIG. 1) about the azimuth plane 190, as discussed in the foregoing, when the device 100 is vertically oriented relative to a flat terrain.

Again, with reference to FIG. 2, as depicted the device 100 further comprises at least one optional proximity detector 240, at least one optional orientation detector 242, and at least one optional push-to-talk (PTT) detector 244. The device 100 may comprise one, two or all of the proximity detector 240, the orientation detector 242, and the PTT detector 244, or the device 100 may not include any of the proximity detector 240 and the orientation detector 242 and the PTT detector 244. The push-to-talk detector 244 may be used to detect, for example, whether a radio user is depressing the PTT button 166 in order to transmit a vocal message. The at least one proximity detector 240 and/or the at least one orientation detector 242 may be used to detect when the device 100 is in use with an accessory, such as a holster, and/or when the device 100 is being held by a hand of a user, and/or when the device 100 is being held against an ear of the user.

For example, the memory 222 may store proximity data ranges and/or orientation data ranges corresponding to different operating conditions and when data from the at least one proximity detector 240 and at least one orientation detector 242 match at least one stored proximity data ranges and/or orientation data ranges corresponding to a given operating condition, the processor 220 may determine that the device 100 is being used according to the given operating condition.

In a further example, the processor 220 may determine that a radio user is operating the device 100 in a hand-held position when the push-to-talk detector 244 detects that actuation of the PTT button 166. In other examples, the device 100 may be in communication with an accessory (such as a radio-speaker microphone, not depicted) that includes a respective PTT button (not depicted), and the push-to-talk detector 244 may detect actuation of a PTT button in the accessory. In some examples, the push-to-talk detector 244 may detect actuation of a PTT button (e.g. the PTT button 166 and/or an accessory PTT button, not depicted) by detecting transmission of voice and/or data (and/or any other PTT triggered radio transmission) due to actuation of the PTT button, for example via the transceiver 207 and/or by communicating with the processor 220.

Regardless, such data detected by the detectors 240, 242, 244 may be coordinated with different settings for the RF switch 230 and/or the PSN 232, as described below.

As depicted, the processor 220 is interconnected with the transceiver 207, the RF switch 230, the PSN 232, the proximity detector 240, the orientation detector 242, the PTT detector 244, and the memory 222.

While not depicted, the device 100 further comprises at least one input device (e.g. other than the PTT button 166), at least one speaker, at least one microphone, and/or other human-machine interface devices, such as a display screen, and the like. In further examples, the device 100 may further comprise a location determining device, such as a Global Positioning System (GPS) device and the like.

In general, while not depicted, the transceiver 207 may be a wireless transceiver (and/or one or more wireless transceivers) that may be a component of a communication unit that includes one or more wireless input/output (I/O) interfaces (and optionally a wired I/O interface) that are configurable to communicate with corresponding communication units at other portable wireless communication devices, dispatch devices, and the like, for example via one or more wireless radio and/or communication networks. Such a communication unit may generally comprise a combined modulator/demodulator.

The transceiver 207 may comprise one or more of a digital mobile radio (DMR) transceiver, a Project 25 (P25) transceiver, a terrestrial trunked radio (TETRA) transceiver, a Bluetooth transceiver, a Wi-Fi transceiver, for example operating in accordance with an IEEE 802.11 standard (e.g., 802.11a, 802.11b, 802.11g), an LTE (Long-Term Evolution) transceiver and/or other types of GSM (Global System for Mobile communications) transceivers, a Worldwide Interoperability for Microwave Access (WiMAX) transceiver, for example operating in accordance with an IEEE 802.16 standard, and/or another similar type of wireless transceiver configurable to communicate via a wireless radio network.

Furthermore, while not depicted, the processor 220 may be a component of a processing unit which comprises a Random-Access Memory (RAM) and a code Read Only Memory (ROM) (e.g. storing data for initializing system components, for example at a startup and/or boot-up time of the device 100), and a common data and address bus. Furthermore, such memories as well as the memory 222, comprise non-transitory memories and/or non-transitory computer readable mediums. The transceiver 207 may be coupled to the processor 220 via a common data and address bus of a processing unit. Indeed, all components to which the processor 220 is coupled may be in communication with the processor 220 via a common data and address bus of a processing unit.

The processor 220 may include ports (e.g. hardware ports) for coupling to other hardware components (e.g. an input device, a microphone, a display screen, and the like) which may be internal and/or external to the device 100.

The processor 220 includes one or more logic circuits, one or more processors, one or more microprocessors, one or more ASIC (application-specific integrated circuits) and one or more FPGA (field-programmable gate arrays), and/or another electronic device. In some examples, the processor 220 and/or the device 100 is not a generic processor and/or a generic device, but a device specifically configured to implement functionality for controlling the RF switch 230, and/or the PSN 232, as described in more detail below. For example, in some examples, the device 100 and/or the processor 220 specifically comprises a computer executable engine configured to implement functionality for controlling the RF switch 230, and/or the PSN 232.

The static memory 222 is a non-transitory machine readable medium that stores machine readable instructions to implement one or more programs or applications, and applicable data thereof. Example machine readable media include a non-volatile storage unit (e.g. Erasable Electronic Programmable Read Only Memory ("EEPROM"), Flash Memory) and/or a volatile storage unit (e.g. random-access memory ("RAM")). In the example of FIG. 2, programming instructions (e.g., machine readable instructions) that implement the functional teachings of the device 100 as described herein are maintained, persistently, at the memory 222 and used by the processor 220, which makes appropriate utilization of volatile storage during the execution of such programming instructions.

In particular, the memory 222 stores instructions corresponding to the at least one application 223 that, when executed by the processor 220, enables the processor 220 to implement functionality for controlling the RF switch 230, and/or the PSN 232 (e.g. when the RF switch 230 and/or the PSN 232 are present). In illustrated examples, when the processor 220 executes the one or more applications 223, and when the RF switch 230 and/or the PSN 232 are present, the processor 220 is enabled to one or more of: operate the RF switch 230 to control electrical coupling between the RF transceiver 207 and the second antenna element 202, wherein the RF transceiver 207 is coupled to the second antenna element 202 when the processor 220 closes the RF switch 230 and the RF transceiver 207 is not coupled to the second antenna element 202 when the processor 220 opens the RF switch 230; and operate the PSN 232 to control one or more of: a phase delay between the first antenna element 201 and the second antenna element 202, a gain parameter of the RF transmission line 205, an electrical length of the RF transmission line 205, and a frequency-dependent phasor-shaping functionality of the RF transmission line 205.

Furthermore, as depicted, the RF switch 230 may comprises an optional switch matrix 245, and in particular a reconfigurable RF multi-port device featuring controllable switches that may selectively or simultaneously couple each port of the switch matrix 245 to a respective number of other ports of the switch matrix 245. The simplest case of such switch matrix 245 corresponds to a single-pole single-throw (SPST) two-port architecture, such as the one schematically illustrated in FIG. 2 for the RF switch 230, where the controllable RF switch 230 either couples to each other the antenna elements 201, 202 or decouples them. In another example, the RF switch 230 includes a number of additional ports leading to respective RF components (e.g. inductors, capacitors, resistors, RF stubs, and the like) which may provide selective impedance loading to one or both antenna elements 201, 202.

In particular, such a switch matrix 245 may provide static and/or dynamic tuning capabilities for the frequency-response of the antenna 101 when the second antenna element 202 is decoupled from the RF transceiver 207 at the RF switch 230 while the first antenna element 201 remains coupled to the RF switch 230, since for example some of the ports of the switch matrix 245 may be loaded with respective impedances which can be coupled selectively and/or simultaneously to the first antenna element 201 via the RF switch 230. Therefore, the selectively and/or simultaneously coupled impedances may alter the loading impedance presented by the RF transmission line 205 at the RF port 203, thereby altering the loading impedance for the RF transceiver 207 at the RF port 209, since the impedance presented by the RF transmission line 205 loads the RF circuit 213 at the RF port 203, and the RF circuit 213 is coupled with the first antenna element 201 inside the antenna 101, thus changes in the impedance presented by the RF transmission line 205 to the RF circuit 213 at the RF port 203 may correspondingly alter the loading impedance for the RF transceiver 207 at the RF port 209. The static and/or dynamic alteration of the loading impedance for the RF transceiver 207 at the RF port 209 may in turn change the frequency range where impedance match, and thus efficient RF power transfer, may occur between the RF transceiver 207 and the antenna 101, thereby providing for static and/or dynamic tuning capabilities for the frequency-response of the antenna 101. Altering the input impedance of the first antenna element 201 via the switch matrix 245 of the RF switch 230 may thus provide dynamic tuning of the antenna element 201, via the processor 220 controlling the switch matrix 245 of the RF switch 230, for example to selectively operate the antenna 101 in sub-ranges of an operating frequency range of the transceiver 207, and/or for example to improve the impedance match for the transceiver 207 at the RF port 209 (e.g. in response to the detection of a proximity of the device 100 to a user body via the proximity detector 240, and/or in response to the push-to-talk detector 244 detecting actuation of the PTT button 166).

Furthermore, when the RF switch 230 includes the switch matrix 245, the switch matrix 245 may concurrently provide tuning capabilities for both the antenna 101 and the second antenna element 202 when they are coupled to each other through the RF switch 230, for example upon engaging selectively and/or simultaneously the RF components coupled at any and/or all the remaining ports of the switch matrix 245 of the RF switch 230. Such tuning capabilities of the switch matrix 245 of the RF switch 230 may include, but is not limited to, concurrently altering the input impedance presented to the RF circuit 213 at the RF port 203, as well as the input impedance presented to the RF transceiver 207 at the RF port 209, when the RF port 203 is electrically coupled to the second antenna element 202 and hence also the RF port 209 is electrically coupled to the second antenna element 202 (e.g. the switch matrix 245 is electrically coupled to the second antenna element 202 as well as to the RF feedpoint of the antenna 101 and/or the first antenna element 201); in these examples, an impedance match for the RF transceiver 207 at the RF port 209 may be provided by the processor 220 controlling the settings of the switch matrix 245. Indeed, as described above, the impedance match for the RF transceiver 207 at the RF port 209 depends on the impedance presented by the RF transmission line 205 at the RF port 203, and hence the loading impedance for the RF transceiver 207 is dependent, in these examples, on the dynamically controlled operating state of the switch matrix 245 of the RF switch 230. Moreover, the processor 220 controlling the switch matrix 245 and/or the RF switch 230 may also alter the composite radiation pattern of the antenna elements 201, 202, for example in order to balance the composite radiation pattern so as to exhibit a peak gain direction 185 oriented about the azimuth plane 190.

The processor 220 may be configured to operate the RF switch 230 in response to determining one or more of: a current operating band of the RF transceiver 207; a forecast operating band of the RF transceiver 207; a current orientation of the housing 105; a forecast orientation of the housing 105; a current operating wireless communication network; a forecast operating wireless communication network; a current user identifier; a battery charging state a type of accessory in use at the portable wireless communication device; a determined quality parameter of a current wireless communication network; and a tuning state of one or more of the first antenna element 201 and the second antenna element 202.

Similarly, processor 220 may be configured to operate the PSN 232 in response to determining one or more of: a current operating band of the RF transceiver 207; a forecast operating band of the RF transceiver 207; a current orientation of the housing 105; a forecast orientation of the housing 105; a current operating wireless communication network; a forecast operating wireless communication network; a current user identifier; a battery charge status; a type of accessory in use at the portable wireless communication device 100; a determined quality parameter of a current wireless communication network; and a tuning state of one or more of the first antenna element 201 and the second antenna element 202.

Indeed, in each of these examples, the processor 220 may determine a parameter associated with the device 100 and operate the RF switch 230 and/or the PSN 232 to change a radiation pattern of the antenna elements 201, 202.

In some examples, the parameters may be determined based on data from one or more of the proximity detector 240, the orientation detector 242, and the PTT detector 244. In other examples the processor 220 may store (e.g. at the memory 222) previous data of one or more of the proximity detector 240 and the orientation detector 242, and/or a history of operating bands of the RF transceiver 207, and adjust the radiation pattern of the antenna elements 201, 202 via the RF switch 230 and/or the PSN 232 accordingly, for example to control the composite radiation pattern of the antenna elements 201, 202.

For example, a current operating band and/or location (e.g. the location determined using a GPS device of the device 100, and the like) of the device 100 may indicate a particular direction in which to orient the composite radiation pattern (e.g. due to a positions of associated infrastructure antenna supporting the current operating band, and, optionally, also in view of the current readings from the proximity detector 240 and/or the orientation detector 242 and/or the PTT detector 244) and the processor 220 may control the composite radiation pattern accordingly via the RF switch 230 and/or the PSN 232. Similarly, a history of the transceiver 207 operating bands stored at the memory 222 as a function of time and/or location of the device 100 may assist the processor 220 with forecasting an operating band of the device 100 for example based on a current time and/or location of the device 100, and the processor 220 may control (e.g. and optionally also based on current readings from the proximity detector 240 and/or the orientation detector 242 and/or the PTT detector 244) the composite radiation pattern accordingly via the RF switch 230 and/or the PSN 232 in anticipation of the forecast operating band.

Similarly, in some examples, a current orientation of the housing 105 (as determined using the orientation detector 242) and/or a type of accessory in use at the portable wireless communication device 100 (as determined using the proximity detector 240 and/or the orientation detector 242) may indicate a relative orientation of the device 100 as worn by a user, such as vertical orientation in a holster, and the like. Similarly, a history of the orientation of the device 100 a function of time and/or location may be stored at the memory 222. Hence, the current and/or forecast orientation and/or the type of accessory in use at the portable wireless communication device 100 may assist the processor 220 in determining a direction in which to control the composite radiation pattern via the RF switch 230 and/or the PSN 232 (e.g. and which may optionally be determined, by the processor 220, in view of the current operating wireless communication network and history thereof).

Indeed, the proximity detector 240 and/or the orientation detector 242 and/or the PTT detector 244 may further assist the processor 220 in determining whether the device 100 is in a holster and/or being held in hand of a user and/or whether the device 100 is being held against an ear of the user, and the processor 220 may control (e.g. and optionally also in view of the current operating wireless communication network and history thereof) the radiation pattern via the RF switch 230 and/or the PSN 232, for example to orient the composite radiation pattern to exhibit peak gain directions about the azimuth plane 190.

While a battery of the device 100 is not depicted, such a battery may be used to power the device 100 and the processor 220 may control the composite radiation pattern via the RF switch 230 and/or the PSN 232 based on a charging state of the battery. For example, the processor 220 may determine from the charging state of the battery whether the device 100 is being charged in a power-grid powered stationary charger device (table top, wall mount), or other type of charger. In some examples, walls of a table top charger device may physically wrap around the bottom of the device 100 to hold it in a given orientation in order to ensure alignment of the conductive contacts of the charger device and the conductive battery contacts of the device 100 during charging. However, the tight proximity of the charger device walls and the charger device charging conductive contacts to the bottom portion of device 100 may interfere with the operation of the second antenna element 202 when located at the bottom end 160. Hence, in these examples, the processor 220 may decouple the second antenna element 202 from the transceiver 207 by opening the RF switch 230, for example when detecting that a charging state of a battery of the device 100 indicates that the battery is being charged in a stationary charger. The second antenna element 202 may also be decoupled from the transceiver 207 when the charging state indicates that the battery is being charged in a stationary charger to avoid potential electromagnetic interference that may be generated by the charger device electronics and otherwise picked up by the second antenna element 202 (e.g. power-grid induced interferences), which could then be transferred to the RF transceiver 207 via the RF transmission line 205 (e.g. unless the RF switch 230 is opened), potentially causing undesirable disturbances to the device 100 electronics.

Similarly, the processor 220 may more precisely control the radiation pattern towards an infrastructure antenna when a quality parameter of a current wireless communication network meets a given threshold state. For example, when a quality parameter, such as Received Signal Strength Indicator (RSSI) value, of a wireless communication network falls below a threshold RSSI value, the processor 220 may more precisely determine a direction of an infrastructure antenna by controlling the RF switch 230 and/or the PSN 232 to scan the composite radiation pattern through different directions to determine a direction of maximum intensity of a signal from the infrastructure antenna, as indicated upon monitoring RSSI values, and then control the composite radiation pattern in this direction for improved performance.

The processor 220 may further control the radiation pattern based on a current user identifier; in particular, the device 100 may be assigned to a user, such as a police officer (e.g. for an 8-hour working shift, and the like), and the user may sign into the device 100 (and the like) accordingly using a user identifier (e.g. a badge number, a nickname, and the like). The memory 222 may store a history of the radiation pattern controlling for the user in association with the user identifier, and adjust the radiation pattern, for example in accordance with patterns of the user, as stored in the memory 222. For instance, certain users may have leaner bodies than other users, and a "typical" orientation of the device 100 when worn on a belt of a user may depend on a degree of body leanness of the user; hence, an "optimal" composite pattern orientation may be different for different users.

However, the processor 220 may more precisely control the radiation pattern towards an infrastructure antenna at any suitable time and/or under any suitable conditions. For example, the processor 220 may periodically determine such a direction for more precise controlling by periodically controlling the RF switch 230 and/or the PSN 232 to scan the radiation pattern through different directions to determine a direction of maximum intensity of a signal from the infrastructure antenna, as for example indicated by monitoring RSSI values, and adjust the applicable states of the RF switch 230 (e.g. open or closed, and/or a switch matrix 245 thereof) and/or the PSN 232 accordingly.

In some examples, the application 223 may include machine learning and/or deep-learning based algorithms, and the like, which have been trained and/or configured to control the radiation pattern based on any of the above mentioned parameters, and the like. The one or more machine learning algorithms and/or deep learning algorithms of the application 223 may include, but are not limited to: a generalized linear regression algorithm; a random forest algorithm; a support vector machine algorithm; a gradient boosting regression algorithm; a decision tree algorithm; a generalized additive model; neural network algorithms; deep learning algorithms; evolutionary programming algorithms; Bayesian inference algorithms, reinforcement learning algorithms, and the like. However, generalized linear regression algorithms, random forest algorithms, support vector machine algorithms, gradient boosting regression algorithms, decision tree algorithms, generalized additive models, and the like may be preferred over neural network algorithms, deep learning algorithms, evolutionary programming algorithms, and the like, in some public-safety environments. However, any suitable machine learning algorithm and/or deep learning algorithm is within the scope of present examples.

Figure 3A:
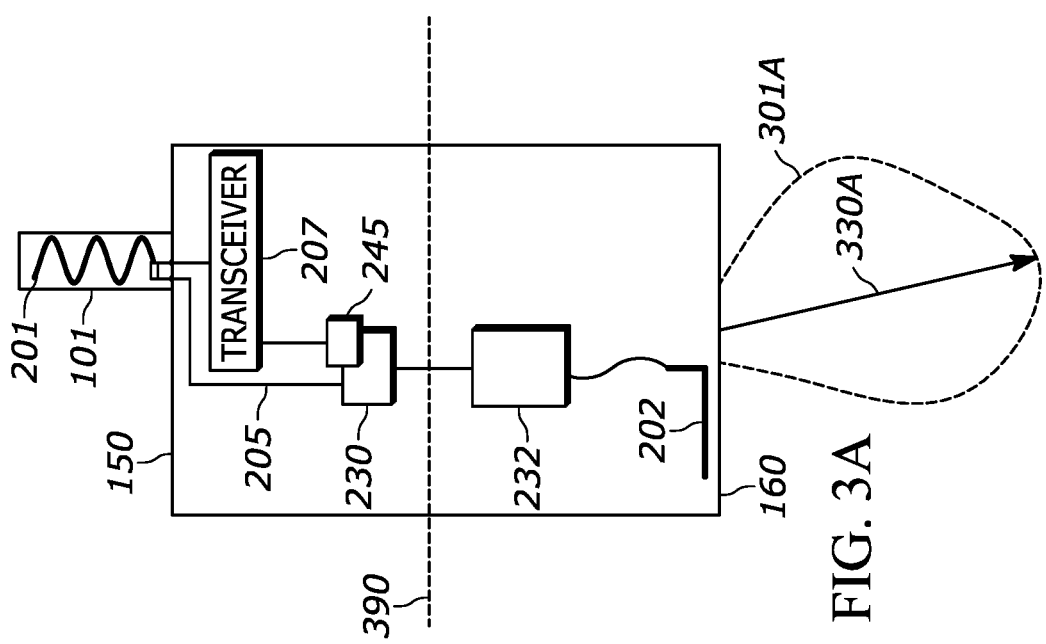
Figure 3C:
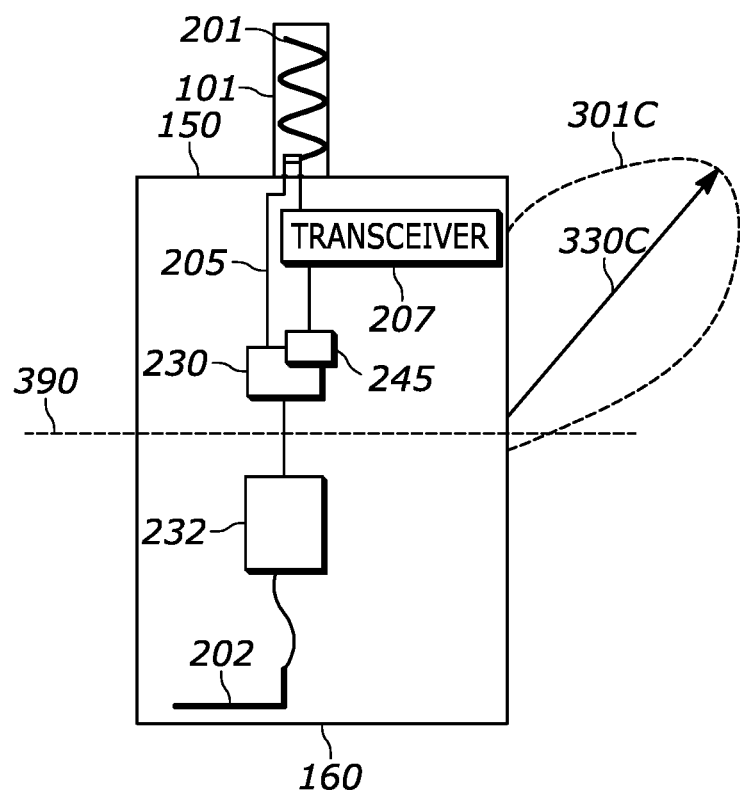

Attention is next directed to FIG. 3A, FIG. 3B and FIG. 3C each of which schematically depicts a simplified block diagram of the device 100 showing the antenna 101, the antenna elements 201, 202, the RF transmission line 205, the RF transceiver 207, the RF switch 230, the switch matrix 245 (when present), and the PSN 232; while the remainder of the components of the device 100 are not depicted, they are nonetheless assumed to be present.

Each of FIG. 3A, FIG. 3B and FIG. 3C further depicts a respective radiation pattern 301A, 301B, 301C when the device 100 is operated under different conditions. For example, in FIG. 3A, the RF switch 230 is open (e.g. as controlled by the processor 220) and the radiation pattern 301A is due to the first antenna element 201 only. Put another way, in FIG. 3A, the first antenna element 201 is electrically coupled to the transceiver 207, but the second antenna element 202 is not electrically coupled to the transceiver 207. As such, the radiation pattern 301A is in a downward direction (e.g. assuming the device 100 is vertically oriented, for example, relative to a flat terrain) and/or the radiation pattern 301A substantially extends from a bottom end 160 of the device 100, with a corresponding peak gain direction 330A oriented at a substantially (relatively) large downward angle relative to its projection onto an azimuth plane whose cross-section is indicated by the dashed line 390.

However, in FIG. 3B, the RF switch 230 is closed (e.g. as controlled by the processor 220) and the composite radiation pattern 301B is due to the coherent RF field emissions of the first antenna element 201 and the second antenna element 202. Put another way, in FIG. 3B, both the first antenna element 201 and the second antenna element 202 are electrically coupled to the transceiver 207, the latter via the RF transmission line 205. By the processor 220 controlling the RF transmission line 205, including controlling the parameters of the RF switch 230 and the PSN 232, the radiation pattern 301B is now oriented about a horizontal direction (e.g. assuming the device 100 is vertically oriented relative to a flat terrain) so that the corresponding peak gain direction 330B is oriented at a relatively small angle relative to its projection onto the azimuth plane.

Similarly, in FIG. 3C, the RF switch 230 is closed (e.g. as controlled by the processor 220) and the composite radiation pattern 301C is due to the coherent RF field emissions of first antenna element 201 and the second antenna element 202. Put another way, in FIG. 3C, the first antenna element 201 and the second antenna element 202 are electrically coupled to the transceiver 207, the second antenna element 202 are electrically coupled to the transceiver 207 via the RF transmission line 205. However, in FIG. 3C, the processor 220 has controlled the PSN 232 so as to orient the composite radiation pattern 301C in prevalently upwards direction as compared to the radiation pattern 301B, such that the corresponding peak gain direction 330C is oriented at a relatively large upward angle relative to its projection onto the azimuth plane.

Hence, the processor 220 may open or close the RF switch 230 and/or control the PSN 232 to control a radiation pattern of the antenna elements 201, 202. The processor 220 may further control the switch matrix 245 (when present) of the RF switch 230 in order to control frequency tuning and/or impedance matching of one or both antenna elements 201, 202.

Figure 4:
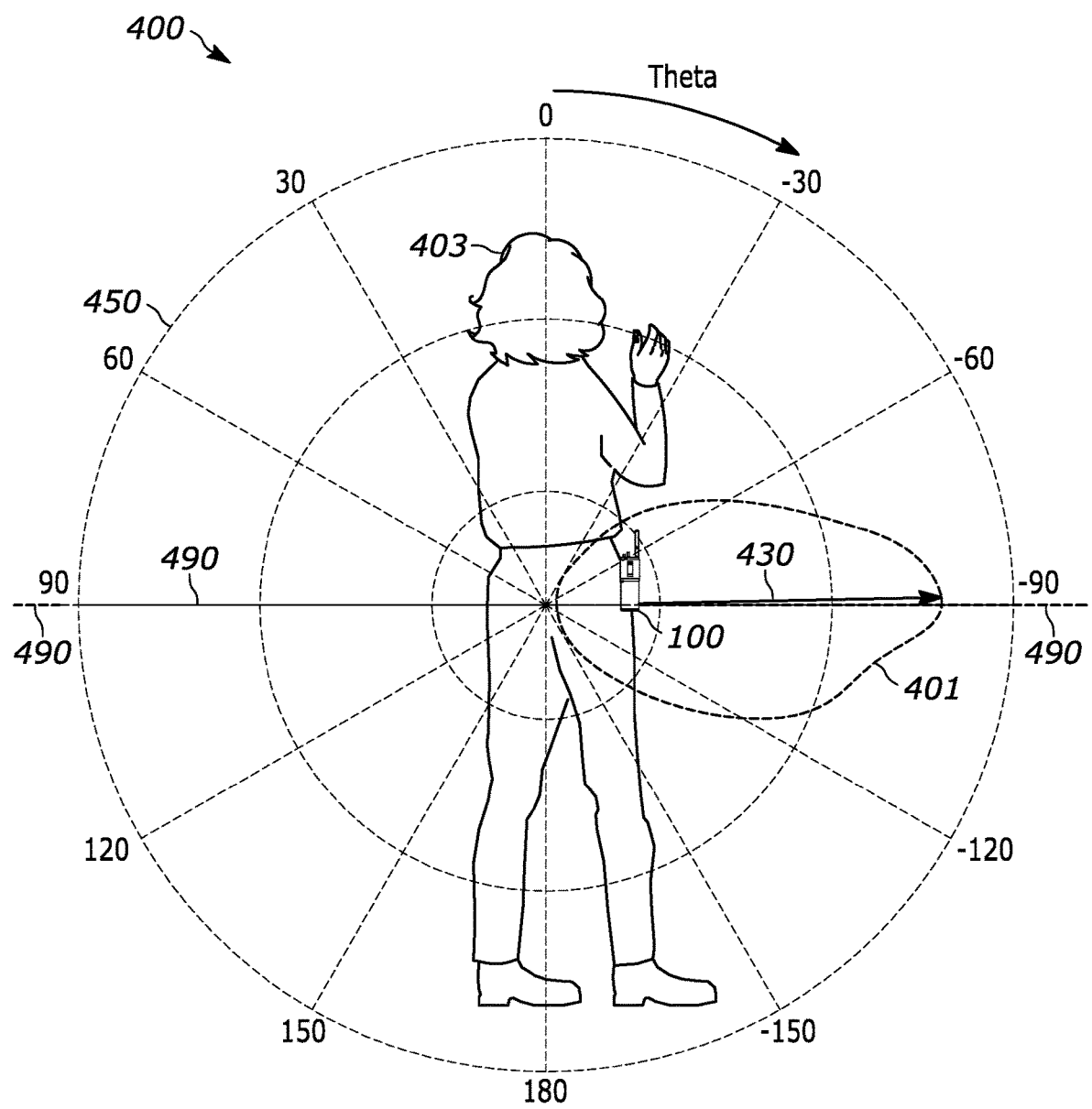
FIG. 4 depicts an angular plot of an example radiation pattern of the device of FIG. 2 when worn at a holster of a user, in accordance with some examples.

Attention is next directed to FIG. 4 which depicts a polar-coordinate plot 400 of an example antenna gain elevation cut 401 of a spherical-coordinate composite antenna gain radiation pattern of the device 100, as calculated using a computer modelling application, when the device 100 is modeled as being worn at a holster of a device user 403 and when both the first antenna element 201 and the second antenna element 202 are electrically coupled to the RF transceiver 207 (for example as depicted in FIG. 3B). In FIG. 4, the radiation pattern magnitude is plotted in a linear radial scale over a specific elevation plane, characterized by the overall peak antenna gain direction laying on it, across all "Theta" elevation angles expressed in degrees about the circular frame 450 laying on the specific elevation plane and enclosing the elevation cut. As depicted, for example, the device 100 is in a substantially vertical position relative to a flat terrain where the user 403 stands, and the composite gain radiation pattern elevation cut 401 is substantially balanced about the azimuth plane, parallel to the flat terrain, whose cross-section is indicated by the dashed line 490, and oriented away from the user 403, so that the peak gain direction 430 is oriented at a relatively small angle relative to its projection onto the azimuth plane. The computer modelling application showed a median azimuth gain of the composite antenna gain radiation pattern about 3 dB larger as compared to when only the first antenna element 201, but not the second antenna element 202, is electrically coupled to the transceiver 207, the corresponding elevation gain pattern cut (not shown) being oriented substantially downward.

Figure 5:
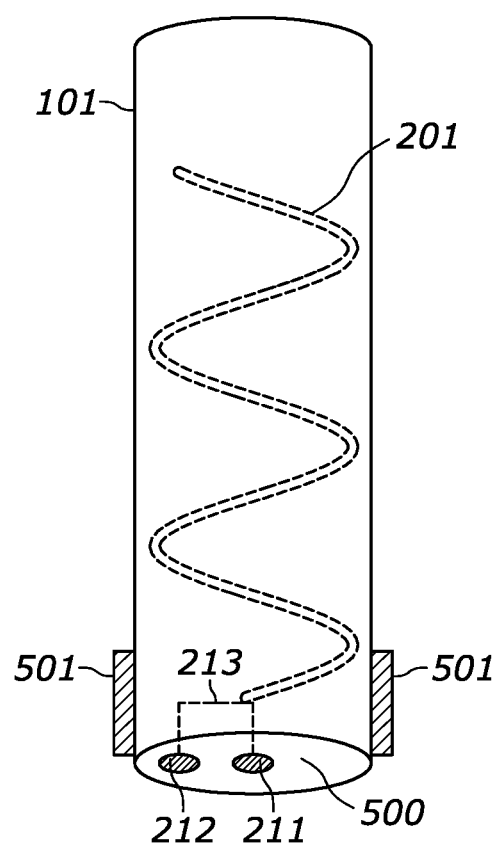
FIG. 5 is a device diagram showing a structure of an antenna for use with the device of FIG. 2, in accordance with some examples.

The antenna 101 is next described in more detail with respect to FIG. 5 which schematically depicts an example of the antenna 101 in a perspective view showing an end 500 of the antenna 101 which coupled to the device 100. Components internal to the antenna 101 are depicted in dashed lines. Furthermore, one or more of the others of the plurality of antennas 103 may have a similar structure to the antenna 101 depicted in FIG. 5, but with respective antenna elements being of different vertical lengths and physical geometries and material compositions.

Furthermore, while the antenna 101 is described with respect to coupling to the device 100, the antenna 101 may couple to any other compatible device.

In general, the antenna 101 comprises: the antenna element 201; a mechanical connector 501 (shown in partial cross-section) configured to removably attach the antenna element 201 to the complementary receptacle 102 of a portable wireless communication device (such as the device 100); the first electrode 211 configured to couple the antenna element 201 to an RF transceiver (such as the RF transceiver 207) of the portable wireless communication device 100 when the antenna element 201 is removably attached to the complementary receptacle 102 of the portable wireless communication device 100 via the mechanical connector 501; and the second electrode 212 configured to couple to an RF port (such as the RF port 203) of the portable wireless communication device 100, the first electrode 211 and the second electrode 212 being electrically coupled to each other (e.g. via the RF circuit 213) such that, when the antenna element 201 is removably attached to the complementary receptacle 102 of the portable wireless communication device 100 via the mechanical connector 501, the RF transceiver 207 is further electrically coupled to the RF port via the first electrode 211 and the second electrode 212, for example via the RF circuit 213 as depicted in FIG. 2.

As described above, the first electrode 211 and the second electrode 212 may be electrically coupled to each other via one or more of: galvanic coupling; capacitive coupling; inductive coupling; and resonant coupling, and the RF circuit 213 may include any suitable combination of resistors, capacitors, inductors, transformers, RF switches, reconfigurable RF components (e.g. a voltage-controlled tunable capacitor, and/or an RF switch and/or a switch matrix, and the like), RF stubs and the like.

The mechanical connector 501 may comprise an antenna bushing connector, with a coaxial and/or ferrule feed structure (e.g. to the electrode 211), and the like and/or any suitable mechanical connector adapted to a complementary connector of the complementary receptacle 102.

Figure 6A:
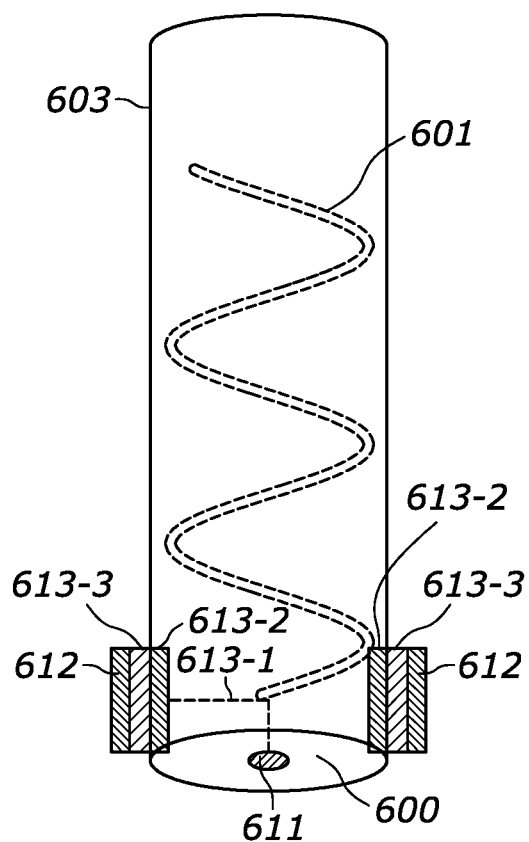
FIG. 6A is a device diagram showing a structure of another antenna which may be used with the device of FIG. 2, in accordance with some examples.

Attention is next directed to FIG. 6A, which depicts an end 600 of another example of an antenna element 601 integrated with an antenna 603, similar to FIG. 5. The antenna 603 is generally similar to the antenna 101 as depicted in FIG. 5, and includes a first electrode 611, similar to the first electrode 211, and a second electrode 612. However, in contrast to the antenna 101, the electrodes 611, 612 are capacitively coupled to each other. For example, the first electrode 611 is coupled to the antenna element 601 via an electrical connection 613-1 and further coupled (also via the electrical connection 613-1) to a first capacitor electrode 613-2 of a capacitor (depicted in partial cross-section). The second electrode 612, which is depicted in partial cross-section, comprises a second capacitor electrode of the capacitor, separated from the first capacitor electrode 613-2 via an RF insulator 613-3, the capacitor having sufficient admittance to allow transfer of RF signals to the RF transmission line 205 (e.g. via the RF port 203 coupled to the electrode 612) within at least one of the operating frequency bands of the RF transceiver 207.

Figure 6B:
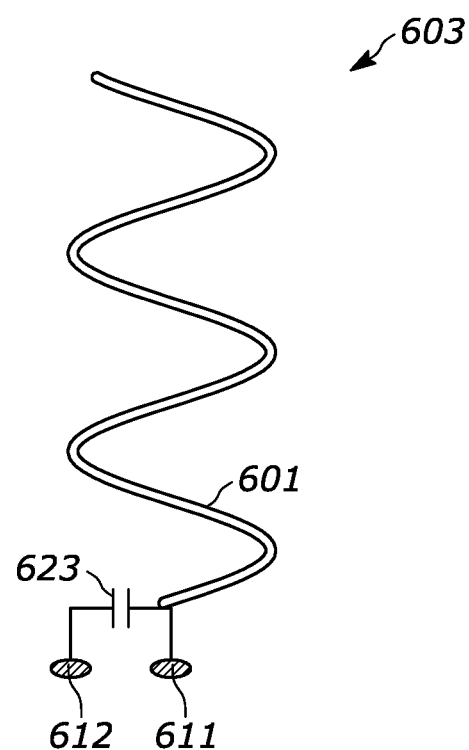
FIG. 6B is an equivalent functional diagram of the antenna of FIG. 6A, in accordance with some examples.

FIG. 6B depicts an equivalent functional diagram of the antenna 603 incorporating the antenna element 601 in which the electrodes 611, 612 are electrically coupled to each other via a capacitor 623 formed from the second electrode 612, the capacitor electrode 613-2 and the RF insulator 613-3. In these examples, the RF port 203 may be adapted accordingly to the geometry of the second electrode 612.

While the antenna 603 is depicted without a mechanical connector, such as the mechanical connector 501, the antenna 603 is understood to include such a mechanical connector.

The antenna 603 may be used with the device 100 and/or another compatible device, with the complementary receptacle 102 and the RF ports 203, 209 adapted to the structure of the antenna 603. Such a device is described in more detail below with respect to FIG. 8.

Figure 7:
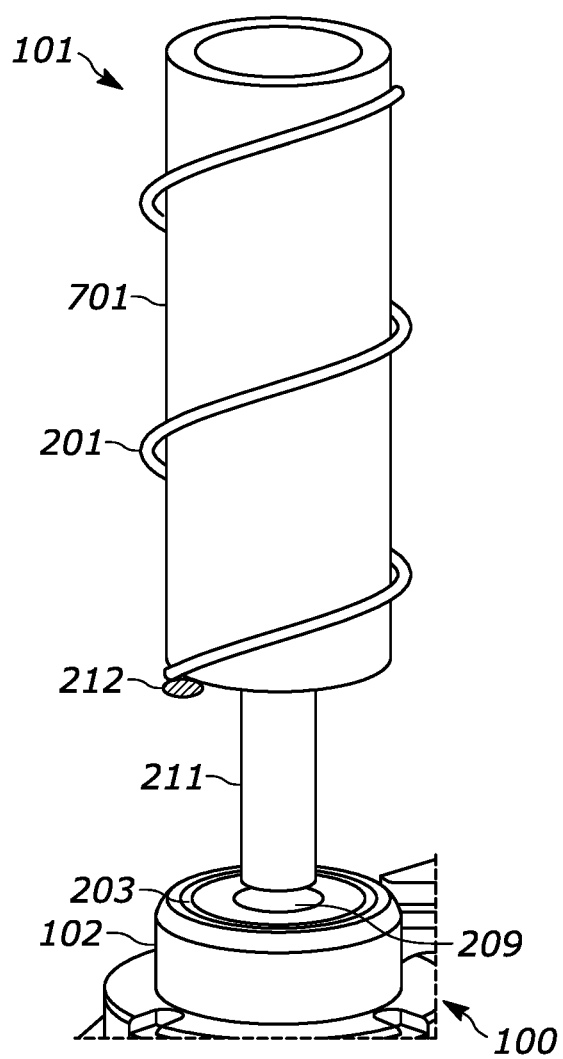
FIG. 7 schematically depicts the antenna of FIG. 5 being attached to a complementary receptacle of the device of FIG. 2, in accordance with some examples.

Attention is next directed to FIG. 7 which schematically depicts the antenna 101 being attached to the complementary receptacle 102 of the device 100. In particular, FIG. 7 depicts the antenna 101 without a protective cover (e.g. a rubber sheath) and shows the first antenna element 201 (e.g. made of metallic wire) helically wrapped around a cylindrical component 701 comprising RF-insulating material. As depicted, the first electrode 211 is schematically depicted as a cylindrical metallic electrode which inserts into the further RF port 209 at the complementary receptacle 102, which also has a cylindrical geometry. As depicted, the RF port 203 comprises a circular metallic electrode at least partially around the further RF port 209 at the complementary receptacle 102.

In particular, the second electrode 212 is located at an insertion end of the antenna 101 (e.g. the end 500) such that, when the first electrode 211 inserts into the further RF port 209 (e.g., to electrically couple with the RF transceiver 207), the second electrode 212 couples (e.g. galvanically) with the circular electrode of the RF port 203. As the RF port 203 has circular symmetry, and as the further RF port 209 is located at a center of the RF port 203, the antenna 101 may be inserted into the complementary receptacle 102 in any rotational orientation with respect to the complementary receptacle 102, and the second electrode 212 will electrically couple to the RF port 203. For example, the electrode 211 could be threaded and operate as a ferrule antenna connector when operatively mated with complementary threads of the further RF port 209 (e.g. the electrode 211 may screw into the further RF port 209). While not depicted, the electrodes 211, 212 are understood to be electrically coupled to each other, as well as coupled to the first antenna element 201, via the RF circuit 213 internal to the antenna 101, as shown in FIG. 2 and FIG. 5.

In yet further examples, the second electrode 212 may have circular symmetry about the RF port 209 and the RF port 203 may be a conductive contact positioned to electrically couple to the circular symmetrical second electrode 212, such that the antenna 101 may be inserted into the complementary receptacle 102 in any rotational orientation with respect to the complementary receptacle 102, and the second electrode 212 will electrically couple to the RF port 203. Hence, one or more of the first antenna element 201 and the RF port 203 may comprises a substantially circular electrode and the substantially circular electrode electrically couples with a respective electrode at the other of the first antenna element 201 and the RF port 203.

Backwards compatibility the device 100 may be best understood with respect to FIG. 7. For example, when antennas that do not include the second electrode 212 are inserted into the complementary receptacle 102, the RF transceiver 207 will not be coupled to the second antenna element 202 since the electrical coupling with the RF port 203 will be non-existent to negligible; however such antennas will otherwise couple to the RF transceiver 207.

Figure 8A:
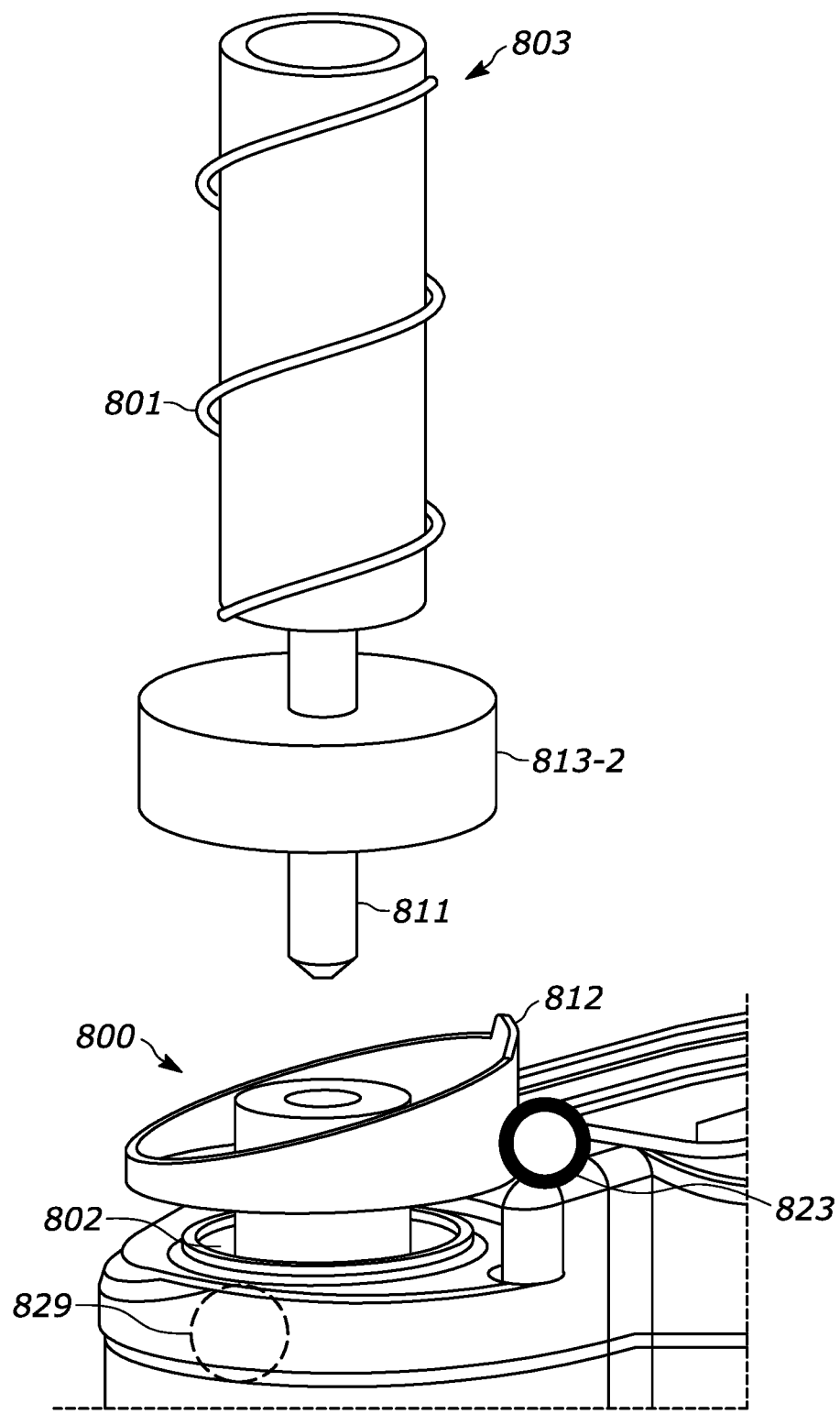
FIG. 8A and FIG. 8B schematically depicts an antenna being attached to a complementary receptacle of a device, in accordance with some examples.
Figure 8B:
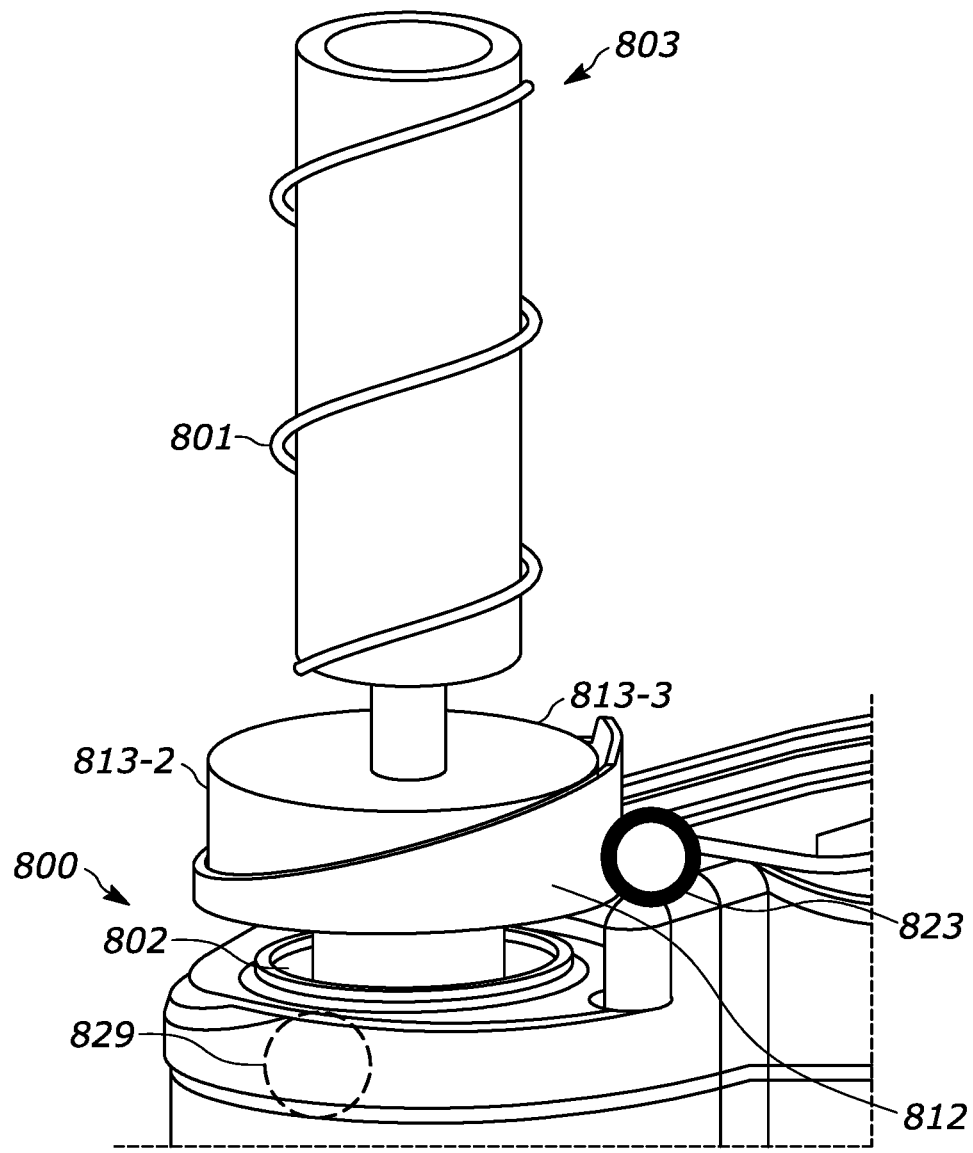

Attention is next directed to FIG. 8A and FIG. 8B which schematically depict an antenna element 801 of an antenna 803 (without a protective cover) being attached to a complementary receptacle 802 of a device 800 that is substantially similar to the device 100, but adapted to receive the antenna 803. FIG. 8A depicts the antenna 803 not inserted into the complementary receptacle 802 of the device 800, and FIG. 8B depicts the antenna 803 inserted into the complementary receptacle 802 of the device 800.

The antenna 803 is substantially similar to the antenna 603 with like elements having like numbers, however in an "800" series rather than a "600" series. Hence the antenna 803 comprises an electrode 811 (corresponding to the electrode 611), and a capacitor electrode 813-2 (corresponding to the capacitor electrode 613-2). While not depicted, it is understood that the antenna 803 includes a connection similar to the connection 613-1, which couples the antenna element 801, the electrode 811 and the capacitor electrode 813-2.

As depicted, the device 800 further includes an RF port 823, similar to the RF port 203, coupled to the electrode 812; while not depicted it is understood that the device 800 includes a second antenna element similar to the second antenna element 202, an RF transmission line between the RF port 823 and the second antenna element, a switch and/or a switch matrix, and the like (though, as in the device 100, such a switch and/or switch matrix may be optional). The device 800 further comprises a processor and/or other components similar to those depicted in FIG. 2.

As depicted, the device 800 further includes a further RF port 829, similar to the further RF port 209, coupled to an RF transceiver (not depicted) of the device 800, and positioned internal to the device 800 (as indicated by the further RF port 829 being depicted in dashed circle), and to couple to the electrode 811 when the antenna 803 is inserted into the complementary receptacle 802.

In contrast to devices and antennas described heretofore, the device 800 includes an electrode 812 that corresponds to the electrode 612 of the antenna 603. Hence, when the antenna 803 is inserted into the complementary receptacle 802 of the device 800 (e.g. as best seen in FIG. 8B), the electrode 812 and the electrode 813-2 capacitively couple, with, for example, air as well as the rubber sheath material of the antenna 803 therebetween acting as an insulating material 813-3, such that an RF transceiver of the device 800 couples to the antenna element 801 as well as to a second antenna element of the device 800.

As depicted, the electrode 813-2 is cylindrically shaped and sized to fit inside the electrode 812, which is circularly shaped, though, as depicted, a circular wall of the electrode 812 is not circularly symmetric, though the electrode 813-2 is circularly symmetric. In general, only one of the electrodes 812, 813-2 needs to be circularly symmetric to ensure a desirable level of capacitive coupling therebetween regardless of the rotational orientation of the antenna 803 with respect to the complementary receptacle 802 when the antenna 803 is inserted into the complementary receptacle 802 in order to couple with the RF port 829. However, both electrodes 812, 813-2 may be circularly symmetric. In some examples, the electrode 813-2 is generally configured to rotate within the electrode 812. In further examples, the electrode 813-2 is generally configured to be concentric with the electrode 812.

Hence, as the electrode 813-2 is generally configured to rotate within the electrode 812, the antenna 803 may be "screwed" into the complementary receptacle 802 and/or the electrodes 812, 813-2 may be any rotational orientation with respect to each other, with the electrode 812 electrically coupled to the RF port 823 and the electrode 811 electrically coupled to the RF port 829.

The device 800 is also backwards compatible with antennas that do not include the capacitor electrode 813-2, as when such antennas are inserted into the complementary receptacle 802, an RF transceiver of the device 800 will not be coupled to a second antenna element of the device 800, since the coupling with the RF port 823 will be non-existent to negligible; however such antennas will otherwise couple to the RF transceiver of the device 800.

Provided herein is device that includes, for example, top and bottom antenna elements, which may enhance radiation pattern performance in the 700-900 MHz operating frequency range by increasing a median azimuth gain (e.g. by about 3 dB) when compared with standard QW antennas, without requiring longer antennas (e.g. HW antennas). A top antenna element and/or a first antenna element is fed similarly to conventional LMR antennas using an RF port at the device and a corresponding electrode at the first antenna element. However, the first antenna element may incorporate a second electrode, for example at an antenna connector end, which is coupled to one end of an RF transmission line (e.g. coaxial cable and the like) feeding a bottom antenna element and/or a second antenna element. Such a coupling (e.g. galvanic and/or capacitive and/or inductive, etc.) to the RF transmission line may occur through an RF circuit within the first antenna element. In some examples, the RF transmission line to the second antenna element may be switched on and off; decoupling the second antenna element from the RF transceiver may lead to better performance in certain operating conditions, such as some hand-held operating conditions. The device described herein may be backwards compatible with conventional QW antennas and/or HW antennas and/or multi-band antennas.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In this document, language of "at least one of X, Y, and Z" and "one or more of X, Y and Z" may be construed as X only, Y only, Z only, or any combination of two or more items X, Y, and Z (e.g., XYZ, XY, YZ, XZ, and the like). Similar logic may be applied for two or more items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A portable wireless communication device comprising:
   a housing;
   a ground reference mass;
   a first antenna element;
   a second antenna element, the first antenna element and the second antenna element being located at different sides of the housing;
   a radio-frequency (RF) port electrically coupled to the first antenna element;
   an RF transmission line between the RF port and the second antenna element, the ground reference mass comprising a ground structure of the RF transmission line; and
   an RF transceiver electrically coupled to the first antenna element, the RF transceiver further electrically coupled to the RF port to further electrically couple the RF transceiver to the second antenna element via the RF transmission line.

2. The portable wireless communication device of claim 1, wherein the RF port is adjacent the first antenna element.

3. The portable wireless communication device of claim 1, wherein the first antenna element is removably attached to the housing via a complementary receptacle of the housing.

4. The portable wireless communication device of claim 1, wherein the first antenna element is coupled to the RF transceiver via a further RF port located at a complementary receptacle of the housing, the further RF port electrically coupling the RF transceiver to a first electrode of the first antenna element.

5. The portable wireless communication device of claim 4, wherein the RF port is located at the complementary receptacle.

6. The portable wireless communication device of claim 4, wherein electrical coupling between the RF transceiver and the RF port occurs via the first antenna element.

7. The portable wireless communication device of claim 4, wherein the first antenna element comprises a second electrode electrically coupled to the first electrode, the second electrode positioned to electrically couple to the RF port at the complementary receptacle.

8. The portable wireless communication device of claim 1, wherein one or more of the first antenna element and the RF port comprises a substantially circular electrode and the substantially circular electrode electrically couples with a respective electrode at the other of the first antenna element and the RF port.

9. The portable wireless communication device of claim 1, wherein the first antenna element is configured to operate over a first set of frequency bands, and the second antenna element is configured to operate over a second set of frequency bands that at least partially overlaps with the first set of frequency bands.

10. The portable wireless communication device of claim 1, further comprising:
a processor; and
an RF switch located along the RF transmission line,
the processor configured to:
operate the RF switch to control electrical coupling between the RF transceiver and the second antenna element, wherein the RF transceiver is coupled to the second antenna element when the processor closes the RF switch and the RF transceiver is not coupled to the second antenna element when the processor opens the RF switch.

11. The portable wireless communication device of claim 10, wherein the processor is configured to operate the RF switch in response to determining one or more of:
a current operating band of the RF transceiver;
a forecast operating band of the RF transceiver;
a current orientation of the housing;
a forecast orientation of the housing;
a current operating wireless communication network;
a forecast operating wireless communication network;
a current user identifier;
a battery charging state;
a type of accessory in use with the portable wireless communication device;
a determined quality parameter of a current wireless communication network; and
a tuning state of one or more of the first antenna element and the second antenna element.

12. The portable wireless communication device of claim 10, wherein the RF switch comprises a switch matrix, and the processor is configured to operate the switch matrix to provide selective impedance loading to at least one of the first antenna element and the second antenna element.

13. The portable wireless communication device of claim 1, further comprising:
a processor; and
a phasor-shaping network located along the RF transmission line,
the processor configured to:
operate the phasor shaping network to control one or more of: a phase delay between the first antenna element and the second antenna element; a gain parameter of the RF transmission line; an electrical length of the RF transmission line; and a frequency-dependent phasor-shaping functionality.

14. The portable wireless communication device of claim 13, wherein the processor is configured to operate the phasor shaping network in response to determining one or more of:
a current operating band of the RF transceiver;
a forecast operating band of the RF transceiver;
a current orientation of the housing;
a forecast orientation of the housing;
a current operating wireless communication network;
a forecast operating wireless communication network;
a current user identifier;
a battery charging state;
a type of accessory in use with the portable wireless communication device;
a determined quality parameter of a current wireless communication network; and
a tuning state of one or more of the first antenna element and the second antenna element.

15. The portable wireless communication device of claim 1, wherein the RF transceiver is electrically coupled to the RF port via one or more of: galvanic coupling; capacitive coupling; inductive coupling; and resonant coupling.

16. The portable wireless communication device of claim 1, wherein the RF port is electrically coupled to the first antenna element via one or more of: galvanic coupling; inductive coupling; and resonant coupling.

17. The portable wireless communication device of claim 1, wherein the RF port is electrically coupled to the first antenna element via capacitive coupling.

18. The portable wireless communication device of claim 1, wherein the first antenna element comprises:
a first electrode configured to electrically couple to the RF transceiver; and
a second electrode configured to electrically couple to the RF port, the first electrode and the second electrode electrically coupled to each other at the first antenna element to couple the RF transceiver to the RF port.

19. An antenna comprising:
an antenna element;
a mechanical connector configured to removably attach the antenna element to a complementary receptacle of a portable wireless communication device;
a first electrode configured to couple the antenna element to an RF transceiver of the portable wireless communication device when the antenna element is removably attached to the complementary receptacle of the portable wireless communication device via the mechanical connector; and
a second electrode configured to couple to an RF port of the portable wireless communication device, the first electrode and the second electrode electrically coupled to each other such that, when the antenna element is removably attached to the complementary receptacle of the portable wireless communication device via the mechanical connector, the RF transceiver is further electrically coupled to the RF port via the first electrode and the second electrode.

20. The antenna of claim 19, wherein the first electrode and the second electrode are electrically coupled to each other via one or more of: galvanic coupling; capacitive coupling; inductive coupling; and resonant coupling.

* * * * *